June 17, 1930.  J. ZAGORSKI  1,764,591
BRAKE DEVICE FOR LAYING ELECTRICAL OPEN AIR LINES, CABLES, AND THE LIKE
Filed Feb. 10, 1928   2 Sheets-Sheet 1
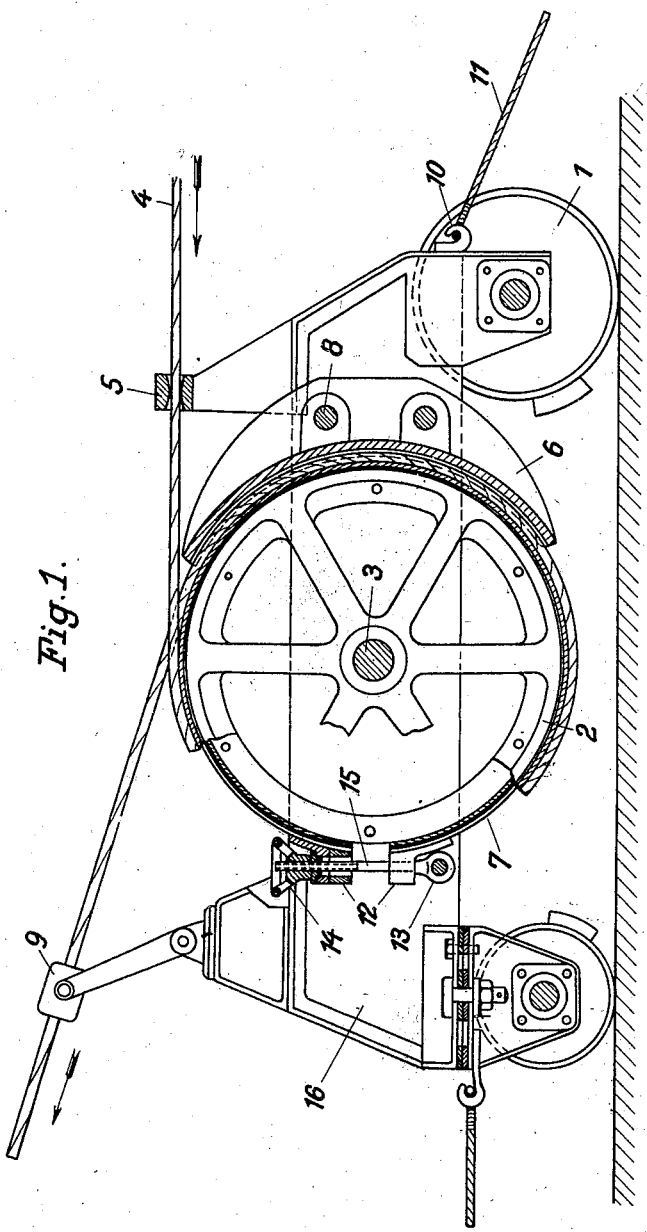
Inventor:
Johann Zagorski June 17, 1930. J. ZAGORSKI 1,764,591
BRAKE DEVICE FOR LAYING ELECTRICAL OPEN AIR LINES, CABLES, AND THE LIKE
Filed Feb. 10, 1928 2 Sheets-Sheet 2
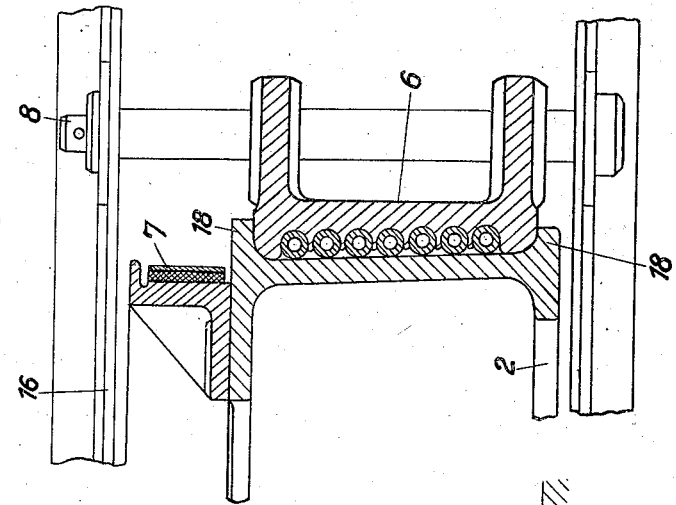
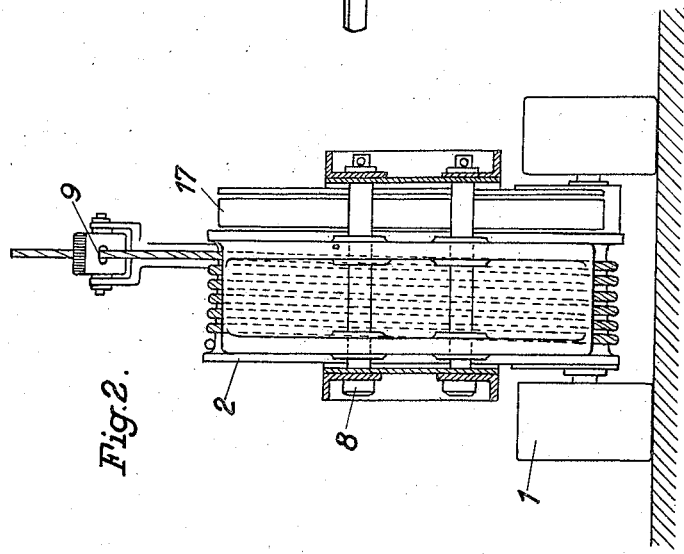
Inventor:
Johann Zagorski

UNITED STATES PATENT OFFICE

JOHANN ZAGORSKI, OF FRANKFORT-ON-THE-MAIN, GERMANY

BRAKE DEVICE FOR LAYING ELECTRICAL OPEN-AIR LINES, CABLES, AND THE LIKE

Application filed February 10, 1928, Serial No. 253,376, and in Germany December 21, 1926.

This invention relates to a brake-device for laying electrical open air lines, cables and the like.

In the laying of electrical open air lines it has been found to be of advantage, that the line to be stretched does not touch the soil. It is therefore usual to arrange a brake between the line winch drawing the line over the fields and the line drum from which the line is unwound, said brake stretching the piece of line between the winch and the drum. In the brakes known for this purpose the line is running in several windings around two drums provided with corresponding grooves, both drums being subjected to braking action. In order that the necessary friction may be safely obtained, when the lines are going over both these drums, it is usual to arrange a cheek brake before the drums for a stretching of the line. This device has, however, the disadvantage, that the form and surface of the line may be varied by the cheek brake. It is also nearly impossible, to brake both the line drums uniformly. When the braking action is, however, not uniform the line may easily slip over the braking device.

These disadvantages are avoided according to the invention which consists in using as the brake a single drum smooth-surfaced around which the line goes in several windings. The drum is provided with a guide for the line, by which the line windings are moved from the upwinding to the unwinding side of the drum. In order to secure a good brake action, the drum is constructed in such a manner that its diameter decreases from the upwinding to the unwinding side. Thus the tension of the line upon the drum cannot be released. At that place where the line coming from the line drum is wound up upon the brake drum their may also be a guide, which has, however, to effect no or no essential brake action.

The new device is illustrated in the annexed drawings by way of example. The invention is however, not limited to this example, but may be widely varied in constructional features, without deviating from the scope of the invention.

Fig. 1 is a longitudinal section of the whole device,

Fig. 2 a view upon the guide with the frame in section and

Fig. 3 a horizontal section through the brake drum and the guide.

Upon a carriage 1 is arranged the brake drum 2 rotating around the axis 3. The line 4 runs through a guide 5 and is passed several times circumferentially about the smooth-surfaced drum 2. The guide 6 is slidably mounted on bolts 8 of the carriage frame, thus making it easily exchangeable. 9 is a guide for the line unwinding from the drum. The carriage 1 is provided with hooks 10 for positioning it by anchoring 11.

The ends of the brake band 7 are provided with lugs 12 through which the threaded bolt 15 passes, one end of the bolt 15 being mounted upon an axle 13 and the other provided with a hand wheel 14.

The smooth surfaced drum 2 may be cylindrical but preferably is slightly conical with its smaller diameter at the unwinding side. This slightly conical form facilitates the lateral shifting of cable 4 towards the unwinding side of the brake drum 2, and opposes the accidental shifting of the cable in the opposite direction, thus preventing slippage of the cable upon reduction of the unwinding tension.

The line 4 is drawn from the cable drum, not shown, through guide 5, and is loosely wound several times circumferentially about the drum 2.

The guide 6 effects the axial movement of the line windings upon the drum 2 towards the unwinding side. In order to avoid a deformation of the line by the comparatively great forces necessary for moving the windings sidewards the guide 6 is preferably provided with profiles as shown in Fig. 3. The guide 6 itself is guided by side flanges 18 of the drum 2. Thus the energy necessary for moving the windings sidewards is taken up by the guide 6 and the drum 2 without being transmitted to the frame work 16 of the carriage 1. A second guide 9 is arranged at the unwinding side of the drum 2 and constructed in such a manner that it may follow the movements of the line and has an equalizing effect upon the line by restoring its desired round cross section, in case the line should have been deformed by the braking action. The brake is constructed in such a manner, that no action takes place upon the axis. The circumferential stresses on band 7 are taken up by axle 13 and transferred to the framework 16. The braking action may be regulated in the usual way by means of hand wheel 14.

The carriage may be anchored in the usual manner for example by hooks 10 and cable 11.

I claim:

1. In a braking device for laying electrical lines and cable, the combination with a smooth-surfaced brake drum of conical form, the diameter decreasing slightly towards the unwinding side, and adjustable means for frictionally opposing the rotation of said drum, of a guide having a helically grooved surface adjacent the face of said drum, the line being wound on said drum and with a portion of each of a plurality of turns seated in the respective grooves of said guide, and guides for directing the line to and from the brake drum.

2. The invention as set forth in claim 1, wherein the said drum is provided with end flanges against which said helically grooved guide is seated.

3. The invention as set forth in claim 1, wherein the guide for directing the line from the drum is provided with an aperture corresponding to the cross-section of the line, whereby any deformation of the line due to the braking action is corrected as the line leaves the drum.

In testimony whereof I affix my signature.

JOHANN ZAGORSKI.